United States Patent
Ayoub

(10) Patent No.: US 11,521,155 B2
(45) Date of Patent: Dec. 6, 2022

(54) METHOD AND SYSTEM FOR DETECTING DURATION AND CAUSE OF BORDER DELAYS

(71) Applicant: BlackBerry Limited, Waterloo (CA)

(72) Inventor: Sameh Ayoub, Ottawa (CA)

(73) Assignee: BlackBerry Limited, Waterloo (CA)

( * ) Notice: Subject to any disclaimer, the term of this patent is extended or adjusted under 35 U.S.C. 154(b) by 574 days.

(21) Appl. No.: 16/035,247

(22) Filed: Jul. 13, 2018

(65) Prior Publication Data

US 2020/0019926 A1 Jan. 16, 2020

(51) Int. Cl.
| | | |
|---|---|---|
| G06Q 10/08 | (2012.01) | |
| H04W 4/38 | (2018.01) | |
| H04W 4/40 | (2018.01) | |
| G01C 21/34 | (2006.01) | |
| H04W 4/021 | (2018.01) | |

(52) U.S. Cl.
CPC ..... *G06Q 10/0833* (2013.01); *G01C 21/3492* (2013.01); *G06Q 10/0831* (2013.01); *G06Q 10/0838* (2013.01); *H04W 4/021* (2013.01); *H04W 4/38* (2018.02); *H04W 4/40* (2018.02)

(58) Field of Classification Search
CPC ............. G06Q 10/083; G06Q 10/0833; G06Q 10/0835; G06Q 10/0836; G06Q 10/0837
See application file for complete search history.

(56) References Cited

U.S. PATENT DOCUMENTS

| | | | |
|---|---|---|---|
| 9,070,100 B2 | 6/2015 | Davidson | |
| 2006/0089787 A1* | 4/2006 | Burr | G08G 1/096883 |
| | | | 701/533 |
| 2007/0038338 A1 | 2/2007 | Larschan et al. | |
| 2007/0067228 A1 | 3/2007 | Furman | |
| 2009/0015400 A1 | 1/2009 | Breed | |
| 2009/0105940 A1* | 4/2009 | Bitan | G01C 21/3415 |
| | | | 701/533 |
| 2010/0141445 A1* | 6/2010 | Venkatasubramaniyam | |
| | | | H04L 67/12 |
| | | | 340/571 |
| 2011/0050423 A1* | 3/2011 | Cova | G06Q 10/0833 |
| | | | 340/572.1 |
| 2011/0054979 A1 | 3/2011 | Cova et al. | |
| 2012/0310527 A1* | 12/2012 | Yariv | G01C 21/3679 |
| | | | 701/426 |

(Continued)

FOREIGN PATENT DOCUMENTS

| | | |
|---|---|---|
| WO | WO2016/093873 A1 | 6/2016 |
| WO | WO2018/068048 A1 | 4/2018 |

OTHER PUBLICATIONS

Sabean, Jonathan, and Crystal Jones. "Inventory of Current Programs for Measuring Wait Times at Land Border Crossings." Transport Canada and Federal Highway Administration (Year: 2008).*

(Continued)

*Primary Examiner* — Emmett K. Walsh
(74) *Attorney, Agent, or Firm* — Moffat & Co

(57) ABSTRACT

A method at a computing device for attributing a cause to a border delay, the method including determining that a vehicle has entered a border geofence; obtaining sensor data from the vehicle; and correlating the sensor data with the determining that the vehicle has entered the geofence to attribute the cause to the border delay.

18 Claims, 8 Drawing Sheets

(56) References Cited

U.S. PATENT DOCUMENTS

| | | | |
|---|---|---|---|
| 2015/0046361 A1* | 2/2015 | Williams | G06Q 10/083 705/330 |
| 2018/0017392 A1* | 1/2018 | Claudel | G01C 21/32 |
| 2018/0041626 A1 | 2/2018 | Dods et al. | |
| 2018/0075408 A1* | 3/2018 | Subramanian | G06Q 10/08345 |

OTHER PUBLICATIONS

European Patent Office, Office Action for application 19186169.9, dated Aug. 12, 2020.
Wikipedia, "Automatic vehicle location", Internet Article, Apr. 23, 2018, from https://en.wikipedia.org/w/index.php?title=Automatic_vehicle_location&oldid=837867349.
European Patent Office, extended European search result for application 19186169.9, dated Aug. 6, 2019.
Wikipedia, Flottenmanagement, Internet article, Jun. 23, 2018 revision, from https://de.wikipedia.org/wiki/Flottenmanagement (this article has been translated by machine translation using Web Translator).
Wikipedia, Fleet management, Internet article, Jun. 27, 2018 revision, from https://en.wikipedia.org/wiki/Fleet_management.
Jack Erjavec et al, Automotive Technology: A Systems Approach, 2015, pp. 616-620, 647-651, 664-668, Delmar Cengage Learning, Clifton Park, NY, USA.
European Patent Office, Summons to Attend Oral Proceedings for application 19186169.9, dated Jan. 19, 2021.

\* cited by examiner

METHOD AND SYSTEM FOR DETECTING DURATION AND CAUSE OF BORDER DELAYS

FIELD OF THE DISCLOSURE

The present disclosure relates to the transportation of goods, and in particular relates to crossings of international borders or crossings of checkpoints for the transportation of goods.

BACKGROUND

When transporting goods, time has always been a key aspect of trade competitiveness. The need for business to hold stock in inventory at a final destination as a buffer against volatility in demand or against delays in border clearance can represent a significant increase in capital costs.

There are many delays that can happen for a shipment. As used herein, a shipment may be any goods that are transported by a vehicle, whether automobile, truck, ship, airplane, among others. Classifying these delays is very important. One Key Performance Indicator (KPI) of shipping companies is the time needed to have the goods cross borders or checkpoints. Delays may be caused by factors such as random inspections, problems with paperwork, or traffic delays, among others. Each delay reduces the per mile yield and lengthens the time of transit, increasing the risk of late deliveries and costing transportation or shipping companies' money.

BRIEF DESCRIPTION OF THE DRAWINGS

The present disclosure will be better understood with reference to the drawings, in which.

DETAILED DESCRIPTION

Figure 1:
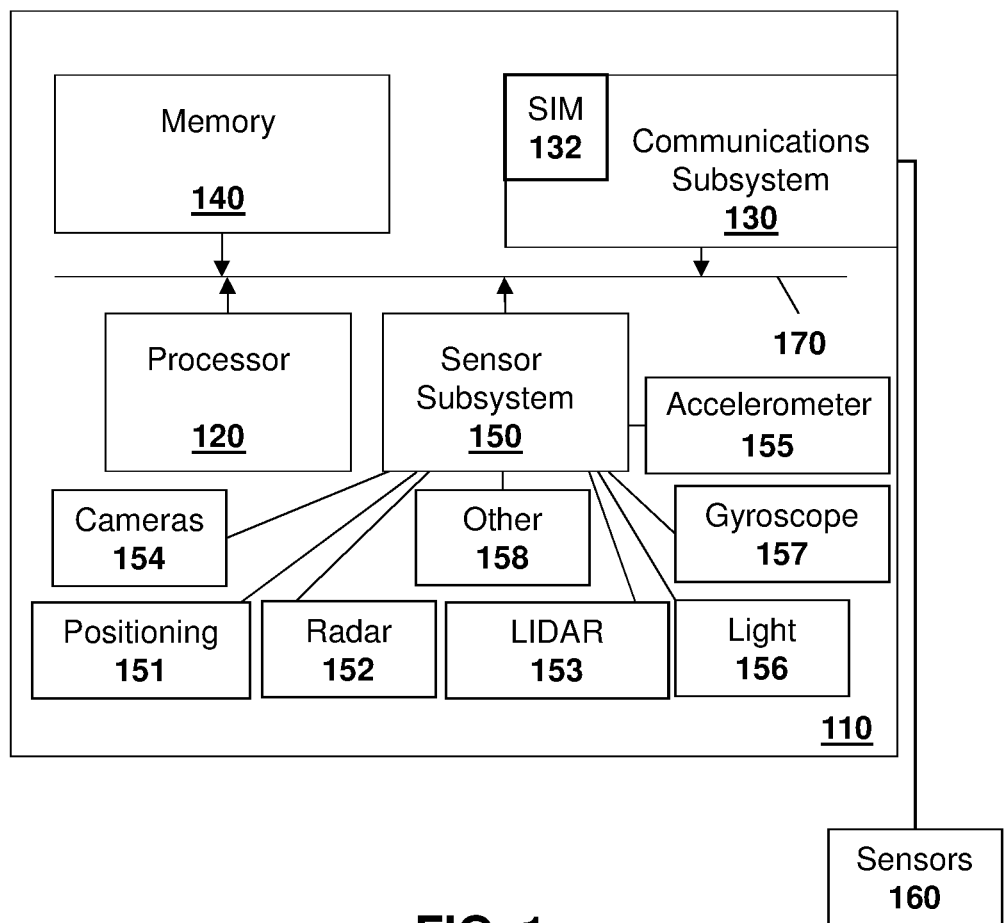
FIG. 1 is block diagram showing a computing device capable of being used in a vehicle.

The present disclosure provides a method at a computing device for attributing a cause to a border delay, the method comprising: determining that a vehicle has entered a border geofence; obtaining sensor data from the vehicle; and correlating the sensor data with the determining that the vehicle has entered the geofence to attribute the cause to the border delay.

The present disclosure further provides a computing device for attributing a cause to a border delay, the computing device comprising: a processor; and a communications subsystem, wherein the computing device is configured to: determine that a vehicle has entered a border geofence; obtain sensor data from the vehicle; and correlate the sensor data with the determining that the vehicle has entered the geofence to attribute the cause to the border delay.

The present disclosure further provides a computer readable medium for storing instruction code, which, when executed by a processor of a computing device configured for attributing a cause to a border delay cause the computing device to: determine that a vehicle has entered a border geofence; obtain sensor data from the vehicle; and correlate the sensor data with the determining that the vehicle has entered the geofence to attribute the cause to the border delay.

In accordance with the embodiments of the present disclosure, a vehicle such as a truck may provide information with regards to border delays to a server or central processor. This may be done using a combination of a geofence around a border crossing, as well as reading from other sensors to determine causes of crossing delays.

Specifically, shipping companies may mark important places by defining a geofence around such a place. Important places are locations where a container or vehicle may be loaded, unloaded, stop for long periods of time, among other options. Such important locations may, for example, include a company yard, a client site, a maintenance site, a border checkpoint, train stations, airports, shipping yards, among other such locations.

Other areas that may be marked include train stations, airports, other ports, among other options.

The shipping company may use a geofence around these important locations to measure KPIs, generate reports, send notifications about each location, for logging and accounting purposes, for fleet management, among other options.

Therefore, in accordance with the embodiments of the present disclosure, a border crossing may have a geofence created to indicate when a vehicle enters an area associated with the border crossing. The geofence may be large enough to accommodate traffic lines or queues such that traffic delays are recorded while within the geofence. Being able to characterize a delay as being caused by traffic rather than driver delay allows for more accurate measurement of KPIs. In some cases, the geofence may be flexible in its boundaries to expand or contract depending on reported border traffic delays.

The vehicle may also have sensors to allow for correlation with positioning data to determine a cause of a border delay. In particular, a vehicle may have accelerometers which may indicate when a vehicle is starting (accelerating) or stopping (slowing down). Door sensors may indicate when a vehicle such as a truck has its at rear doors opened. Light sensors within a cargo area may also be used to detect when doors are opened. Vibration sensor may detect movement in a trailer. In other cases, other sensors could be used.

The combination of the entering a geofence, along with other sensor data, may be correlated at the vehicle or at a server. For example, the data may be reported to a central server and a central server may look for patterns to determine a cause of the border delay. Further, in some cases customs systems may themselves provide data to the computing device or central server to create a more robust picture of the border delays.

The central server may use the border delay data for various purposes. In a first case, a long border delay may delay the shipment and the central server or computing device may provide a report to the receiver and/or customer to indicate that the goods have been delayed.

The central server may further attribute the delay to a particular party. For example, if paperwork was not properly completed then the delay may have been caused by the customers shipping the data. On the other hand, if a driver has pulled over for a rest break, then the delay may be caused by the driver. In other cases, the delay may be attributed to the customs or border agents.

In other cases, the border delays, if systematic, may allow the central server or computing device to perform fleet management operations. In particular, the central server or computing device may determine a location of other trucks or vehicles within the fleet and a destination for such trucks or vehicles. Based on these factors and information with regard to various borders, the central server may redirect some or all of the fleet to different border crossings to allow for system efficiencies.

In other cases, the central server could utilize the data for route planning or forecasting for future deliveries.

Thus, in the embodiments of the present disclosure, sensor systems may be included on the vehicle. A transportation company may have a plurality of sensor apparatuses operating remotely from a central monitoring station to provide remote sensor data to a management or monitoring hub. The sensors may be placed on a trailer, shipping container or similar product to provide a central station with information regarding the container. Such information may include, but is not limited to, information concerning the current location of the trailer or shipping container, the temperature inside the shipping container or trailer, operational parameters such as tire pressure or engine temperature, that the doors on the shipping container or trailer are closed, whether a sudden acceleration or deceleration event has occurred, the tilt angle of the trailer or shipping container, among other data.

In other embodiments the sensor apparatus may be secured to a vehicle itself. As used herein, the term vehicle can include any motorized vehicle such as a truck, tractor, car, boat, motorcycle, snow machine, among others, and can further include a trailer, shipping container or other such cargo moving container, whether attached to a motorized vehicle or not.

In accordance with the embodiments described herein, a sensor apparatus may be any apparatus or computing device that is capable of providing data or information from sensors associated with the sensor apparatus to a central monitoring or control station. Sensors associated with the sensor apparatus may either be physically part of the sensor apparatus, for example a built-in global navigation satellite system (GNSS) chipset, or may be associated with the sensor apparatus through short range wired or wireless communications. For example, a tire pressure monitor may provide information through a Bluetooth™ Low Energy (BLE) signal from the tire to the sensor apparatus. In other cases, a camera may be part of the sensor apparatus or may communicate with a sensor apparatus through wired or wireless technologies. Other examples of sensors are possible.

A central monitoring station may be any server or combination of servers that are remote from the sensor apparatus. The central monitoring station can receive data from a plurality of sensor apparatuses.

One sensor apparatus is shown with regard to FIG. 1. The sensor apparatus of FIG. 1 is however merely an example and other mobile devices could equally be used in accordance with the embodiments of the present disclosure.

Reference is now made to FIG. 1, which shows an example sensor apparatus 110. Sensor apparatus 110 can be any computing device or network node. Such computing device or network node may include any type of electronic device, including but not limited to, mobile devices such as smartphones or cellular telephones. Examples can further include fixed or mobile devices, such as internet of things devices, endpoints, home automation devices, medical equipment in hospital or home environments, inventory tracking devices, environmental monitoring devices, energy management devices, infrastructure management devices, vehicles or devices for vehicles, fixed electronic devices, among others.

Sensor apparatus 110 comprises a processor 120 and at least one communications subsystem 130, where the processor 120 and communications subsystem 130 cooperate to perform the methods of the embodiments described herein. Communications subsystem 130 may, in some embodiments, comprise multiple subsystems, for example for different radio technologies.

Communications subsystem 130 allows sensor apparatus 110 to communicate with other devices or network elements. Communications subsystem 130 may use one or more of a variety of communications types, including but not limited to cellular, satellite, Bluetooth™, Bluetooth™ Low Energy, Wi-Fi, wireless local area network (WLAN), near field communications (NFC), ZigBee, wired connections such as Ethernet or fiber, among other options.

As such, a communications subsystem 130 for wireless communications will typically have one or more receivers and transmitters, as well as associated components such as one or more antenna elements, local oscillators (LOs), and may include a processing module such as a digital signal processor (DSP). As will be apparent to those skilled in the field of communications, the particular design of the communication subsystem 130 will be dependent upon the communication network or communication technology on which the sensor apparatus is intended to operate.

If communications subsystem 130 operates over a cellular connection, a subscriber identity module (SIM) 132 may be provided to allow such communication. SIM 132 may be a physical card or may be virtual. In some embodiments SIM 132 may also be referred to as a universal subscriber identity module (USIM), as merely an identity module (IM), or as an embedded Universal Integrated Circuit Card (eUICC), among other options.

Processor 120 generally controls the overall operation of the sensor apparatus 110 and is configured to execute programmable logic, which may be stored, along with data, using memory 140. Memory 140 can be any tangible, non-transitory computer readable storage medium, including but not limited to optical (e.g., CD, DVD, etc.), magnetic (e.g., tape), flash drive, hard drive, or other memory known in the art.

Alternatively, or in addition to memory 140, sensor apparatus 110 may access data or programmable logic from an external storage medium, for example through communications subsystem 130.

In the embodiment of FIG. 1, sensor apparatus 110 may utilize a plurality of sensors, which may either be part of sensor apparatus 110 in some embodiments or may communicate with sensor apparatus 110 in other embodiments. For internal sensors, processor 120 may receive input from a sensor subsystem 150.

Examples of sensors in the embodiment of FIG. 1 include a positioning sensor 151, a Radar sensor 152, a LIDAR 153, one or more image sensors 154, accelerometer 155, light sensors 156, gyroscopic sensors 157, and other sensors 158. Other sensors may be any sensor that is capable of reading or obtaining data that may be useful for sensor apparatus 110. However, the sensors shown in the embodiment of FIG. 1 are merely examples, and in other embodiments different sensors or a subset of sensors shown in FIG. 1 may be used. For example, in one embodiment of the present disclosure, only a positioning sensor is provided.

The positioning sensor may use a positioning subsystem such as a Global Navigation Satellite System (GNSS) receiver which may be, for example, a Global Positioning System (GPS) receiver (e.g. in the form of a chip or chipset) for receiving GPS radio signals transmitted from one or more orbiting GPS satellites. References herein to "GPS" are meant to include Assisted GPS and Aided GPS. Although the present disclosure refers expressly to the "Global Positioning System", it should be understood that this term and its abbreviation "GPS" are being used expansively to include any GNSS or satellite-based navigation-signal broadcast system, and would therefore include other systems used around the world including the Beidou (COMPASS) system being developed by China, the multi-national Galileo system being developed by the European Union, in collaboration with China, Israel, India, Morocco, Saudi Arabia and South Korea, Russia's GLONASS system, India's proposed Regional Navigational Satellite System (IRNSS), and Japan's proposed QZSS regional system.

Another sort of positioning subsystem may be used as well, e.g. a radiolocation subsystem that determines its current location using radiolocation techniques. In other words, the location of the device can be determined using triangulation of signals from in-range base towers, such as used for Wireless E911. Wireless Enhanced 911 services enable a cell phone or other wireless device to be located geographically using radiolocation techniques such as (i) angle of arrival (AOA) which entails locating the caller at the point where signals from two towers intersect; (ii) time difference of arrival (TDOA), which uses multilateration like GPS, except that the networks determine the time difference and therefore the distance from each tower; and (iii) location signature, which uses "fingerprinting" to store and recall patterns (such as multipath) which mobile phone signals exhibit at different locations in each cell. A Wi-Fi™ Positioning System (WPS) may also be used as a positioning subsystem. Radiolocation techniques and/or WPS may also be used in conjunction with GPS in a hybrid positioning system Other sensors may be external to the sensor apparatus 110 and communicate with the sensor apparatus 110 through, for example, communications subsystem 130. Such other sensors are shown as sensors 160 and the embodiment of FIG. 1. For example, a tire pressure monitoring system may communicate over short range communications such as Bluetooth™ Low Energy with communications subsystem 130 on the sensor apparatus 110. Other examples of sensors 160 are possible.

Further, the sensor apparatus 110 of FIG. 1 may, in some embodiments, act as a gateway, and may communicate with other sensor apparatuses (not shown) on the trailer, where the other sensor apparatuses may act as hubs for a subset of the sensors on the vehicle or trailer.

Communications between the various elements of sensor apparatus 110 may be through an internal bus 170 in one embodiment. However, other forms of communication are possible.

Sensor apparatus 110 may be affixed to any fixed or portable platform. For example, sensor apparatus 110 may be affixed to shipping containers, truck trailers, truck cabs in one embodiment. In other embodiments, sensor apparatus 110 may be affixed to any vehicle, including motor vehicles (e.g., automobiles, cars, trucks, buses, motorcycles, etc.), aircraft (e.g., airplanes, unmanned aerial vehicles, unmanned aircraft systems, drones, helicopters, etc.), spacecraft (e.g., spaceplanes, space shuttles, space capsules, space stations, satellites, etc.), watercraft (e.g., ships, boats, hovercraft, submarines, etc.), railed vehicles (e.g., trains and trams, etc.), and other types of vehicles including any combinations of any of the foregoing, whether currently existing or after arising, among others.

In other cases, sensor apparatus 110 could be carried by a user.

Such sensor apparatus 110 may be a power limited device. For example, sensor apparatus 110 could be a battery operated device that can be affixed to a shipping container or trailer in some embodiments. Other limited power sources could include any limited power supply, such as a small generator or dynamo, a fuel cell, solar power, among other options.

In other embodiments, sensor apparatus 110 may utilize external power, for example from the engine of a tractor pulling the trailer, from a land power source for example on a plugged in recreational vehicle or from a building power supply, among other options.

External power may further allow for recharging of batteries to allow the sensor apparatus 110 to then operate in a power limited mode again. Recharging methods may also include other power sources, such as, but not limited to, solar, electromagnetic, acoustic or vibration charging.

The sensor apparatus from FIG. 1 may be used in a variety of environments. One example environment in which the sensor apparatus may be used is shown with regard to FIG. 2.

Figure 2:
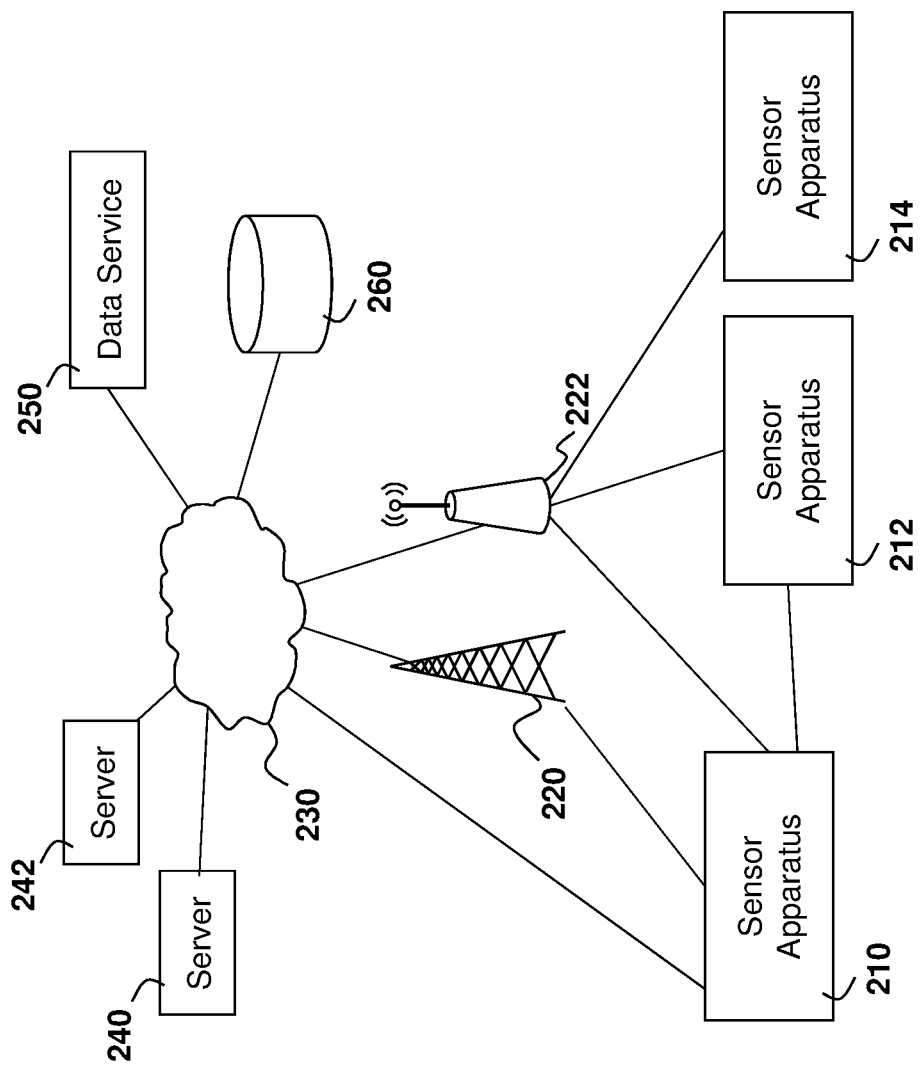
FIG. 2 is a block diagram showing an environment for the operation of the computing device of FIG. 1.

Referring to FIG. 2, three sensor apparatuses, namely sensor apparatus 210, sensor apparatus 212, and sensor apparatus 214 are provided.

In the example of FIG. 2, sensor apparatus 210 may communicate through a cellular base station 220 or through an access point 222. Access point 222 may be any wireless communication access point. For example, access point 222 may be a WiFi router or a private router network. Also, a private router network may have a path from the access point name (APN) to a server, and may reduce network latency based on a location of the sensor apparatus in some embodiments.

Further, in some embodiments, sensor apparatus 210 could communicate through a wired access point such as Ethernet or fiber, among other options.

The communication may then proceed over a wide area network such as Internet 230 and proceed to servers 240 or 242.

Similarly, sensor apparatus 212 and sensor apparatus 214 may communicate with servers 240 or server 242 through one or both of the base station 220 or access point 222, among other options for such communication.

In other embodiments, any one of sensors 210, 212 or 214 may communicate through satellite communication technology. This, for example, may be useful if the sensor apparatus is travelling to areas that are outside of cellular coverage or access point coverage.

In other embodiments, sensor apparatus 212 may be out of range of access point 222, and may communicate with sensor apparatus 210 to allow sensor apparatus 210 to act as a relay for communications.

Communication between sensor apparatus 210 and server 240 may be one directional or bidirectional. Thus, in one embodiment sensor apparatus 210 may provide information to server 240 but server 240 does not respond. In other cases, server 240 may issue commands to sensor apparatus 210 but data may be stored internally on sensor apparatus 210 until the sensor apparatus arrives at a particular location. In other cases, two-way communication may exist between sensor apparatus 210 and server 240.

A server, central server, processing service, endpoint, Uniform Resource Identifier (URI), Uniform Resource Locator (URL), back-end, and/or processing system may be used interchangeably in the descriptions herein. The server functionality typically represents data processing/reporting that are not closely tied to the location of movable image capture apparatuses 210, 212, 214, etc. For example, the server may be located essentially anywhere so long as it has network access to communicate with sensor apparatuses 210, 212, 214, etc.

Server 240 may, for example, be a fleet management centralized monitoring station. In this case, server 240 may receive information from sensor apparatuses associated with various trailers or cargo containers, providing information such as the location of such cargo containers, the temperature within such cargo containers, system information such as tire pressure or vibration sensor readings, any unusual events including sudden decelerations, temperature warnings when the temperature is either too high or too low, accelerometer events such as repeated starting and stopping, indicating a traffic jam, among other data. The server 240 may compile such information and store it for future reference. It may further alert an operator. For example, entry of the vehicle into a restricted geofenced area may provide a warning to operators.

In other cases, server 240 may compile information regarding border crossings and use such information for logging, reporting, or fleet management operations.

Other examples of functionality for server 240 are possible.

In the embodiment of FIG. 2, servers 240 and 242 may further have access to third-party information or information from other servers within the network. For example, a data services provider 250 may provide information to server 240. Similarly, a data repository or database 260 may also provide information to server 240.

For example, data services provider 250 may be a subscription based service used by server 240 to obtain current road and weather conditions. In other cases, data services provider 250 may be a computing system operated by a border agency to provide data on general border conditions or on specific border crossings.

Data repository or database 260 may for example provide information such as image data associated with a particular location, aerial maps, low latency access point names, virtual SIM information, or other such information.

The types of information provided by data service provider 250 or the data repository or database 260 is not limited to the above examples and the information provided could be any data useful to server 240.

In some embodiments, information from data service provider 250 or the data repository from database 260 can be provided to one or more of sensor apparatuses 210, 212, or 214 for processing at those sensor apparatuses.

Utilizing the system from FIGS. 1 and 2 above, methods and systems for determining causes and lengths of border delays, as well as for the possibility of creating remedial actions for a fleet or future road planning are provided.

Figure 3:
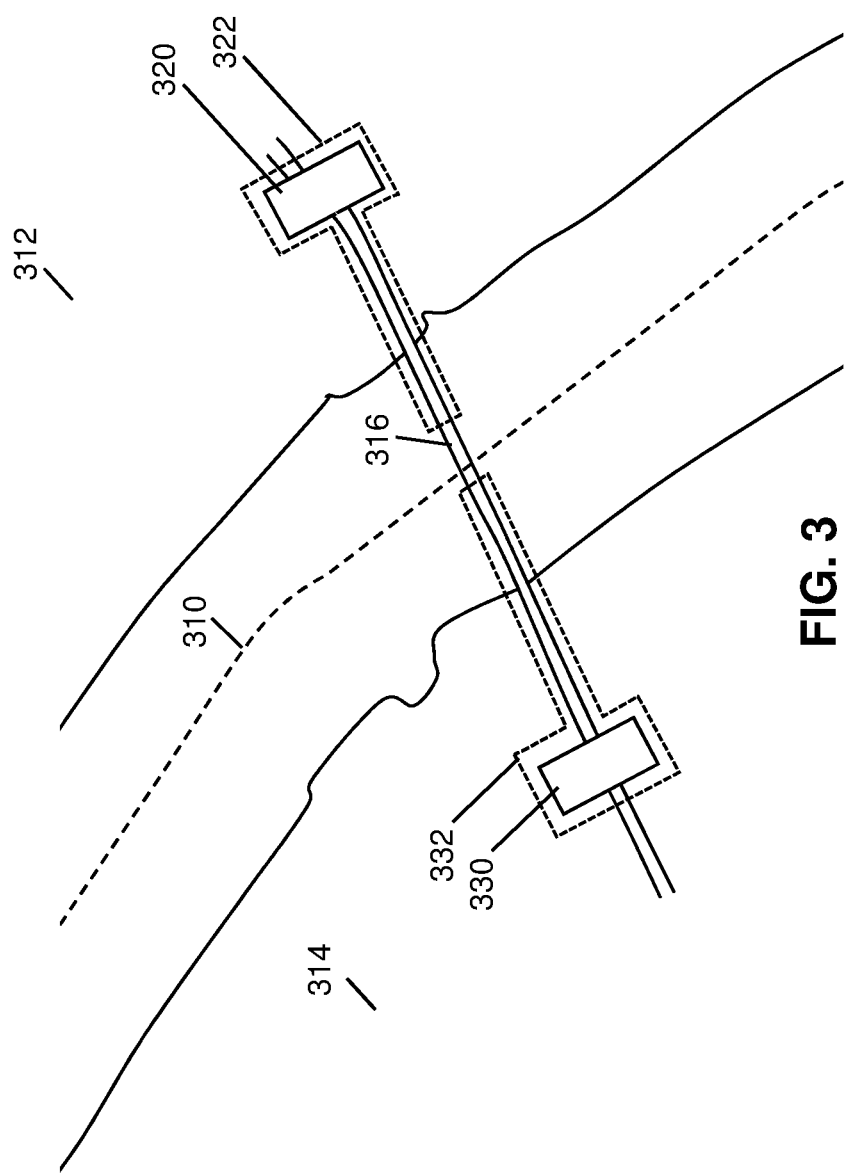
FIG. 3 is a block diagram showing geofences around border crossings.

For example, one border crossing is shown with regard to FIG. 3. In particular, in the embodiment of FIG. 3 a river separates a first country and a second country. An international border 310 is provided at the midpoint of the river between country 312 and country 314.

A bridge 316 spans the river and has a border checkpoint 320 for country 312. Further, border checkpoint 330 is provided for country 314.

In accordance with the embodiments of the present disclosure, a geofence 322 may be provided around border checkpoint 320. Similarly, a geofence 332 may be provided around border checkpoint 330.

As seen in FIG. 3, geofence 322 and geofence 332 may extend onto the bridge 316 in order to cover traffic jams and delays. The length that the geofence extends may be determined based on historic data or may be based on the data reported by the border services and dynamically updated in some cases.

In some cases, geofence 322 and geofence 332 may overlap. In other cases, the distance between border checkpoint 320 and border checkpoint 330 may be large enough that no overlap is needed, even in cases where significant traffic jams exist. In other cases, if overlap is needed, a single geofence may be used.

In some cases, a vehicle crossing from country 314 to country 312 may ignore the geofence around border crossing 330. Specifically, in many cases no exit checkpoints exist. Therefore, the geofence 332 may be ignored. Similarly, a vehicle travelling from country 312 to country 314 may ignore geofence 322 in cases where no exit checkpoint exists.

However, in other cases, exit checkpoints exist for countries and in this case the geofence may be extended to include a traffic approaching checkpoint 320 for vehicles exiting country 312, and to include traffic approaching checkpoint 330 for vehicles exiting country 314.

Other options for border checkpoints are possible. In particular, many land crossings would have the checkpoints closer together and in this case the geofences is may overlap or a single geofence for the entire border may be used.

Utilizing the geofences of FIG. 3, a vehicle that detects it is approaching a border crossing (when entering the geofence) may start to obtain sensor readings, and may then either process the sensor readings to correlate with the border crossing, or provide a report to a central server for the central server to process that the data.

Figure 4:
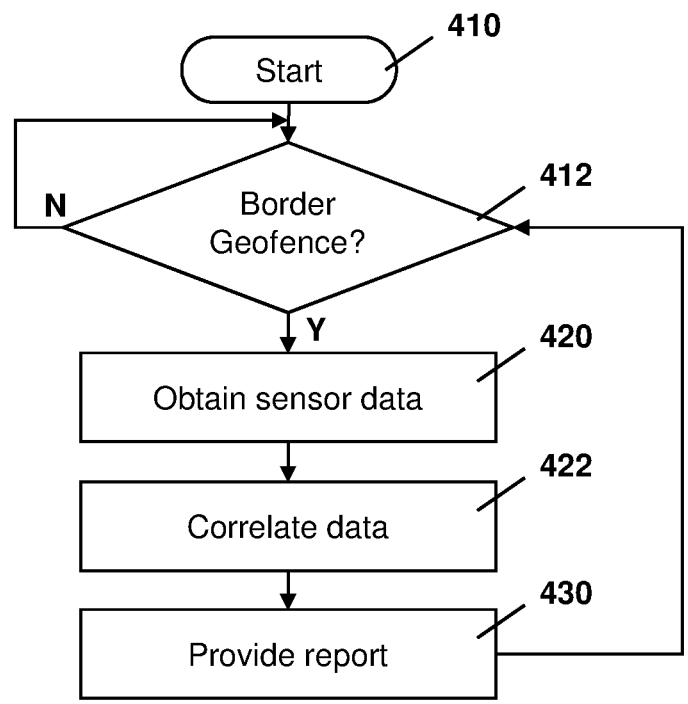
FIG. 4 is a process diagram for a process at a computing device for correlating sensor data with a border crossing event.

In particular, reference is now made to FIG. 4, in which the process starts at block 410 and proceeds to block 412. At block 412, a computing device associated with a vehicle checks whether a positioning system has detected that the vehicle has entered a border geofence.

In one embodiment, the entering of the geofenced area around a border may only be triggered when the vehicle is entering a country, and may ignore border crossing geofences when leaving a country. In other cases, the detection at block 412 may register also when the vehicle is exiting a country. Other options are possible.

If the vehicle has not entered a border geofence, then the process proceeds to loop to block 412 until the detection is made at that the vehicle has entered the border geofence.

Once the vehicle has detected that the border geofence has been entered, the process proceeds from block 412 to block 420. At block 420, sensor data may be obtained from sensors associated with the vehicle. In particular, the sensor data may include various sensors such as, but not limited to, door sensors, accelerometers, vibration sensors, light sensors, amongst others.

The process then proceeds to block 422 in which the sensor data and the positioning data are correlated. In particular, once it is detected at the vehicle has entered the border geofence, sensor data may be attributed to various activities within that border area. For example, a door open event or light sensors in a trailer may indicate that the vehicle has been inspected by customs agents and may provide a reason for the delay at the border.

Similarly, a vibration sensor may indicate that the trailer has been entered by a person and may further indicate a customs inspection.

In some cases, a combination of sensors may also provide indications. For example, a combination of a door opening event as well as detection by vibration sensor may indicate that the customs inspection has occurred.

In other cases, the accelerometer may detect a pattern of moving and stopping, and then moving and stopping. This may provide an indication that there is a lineup waiting to reach the border patrol. Thus, this may indicate that that a traffic jam exists. In some embodiments, the geofence may be large enough to capture the length of a traffic jam leading to a border crossing.

In other cases, data may also be received by the computing device which may be correlated at block 422. For example, the customs service may provide indications such as wait times, preclearance of paperwork, among other factors and this may be considered at block 422.

Once the data is correlated, the process may proceed to block 430 in which a report is provided based on the data. For example, the report may indicate the times that the border geofence was entered. In some cases, if the order geofence has been exited, then the time of exit may also be provided. Further, the conclusions from correlating the sensor data may also be provided to a server or cloud computing platform to allow the server or cloud computing platform to process the data, for example as described below.

Figure 5:
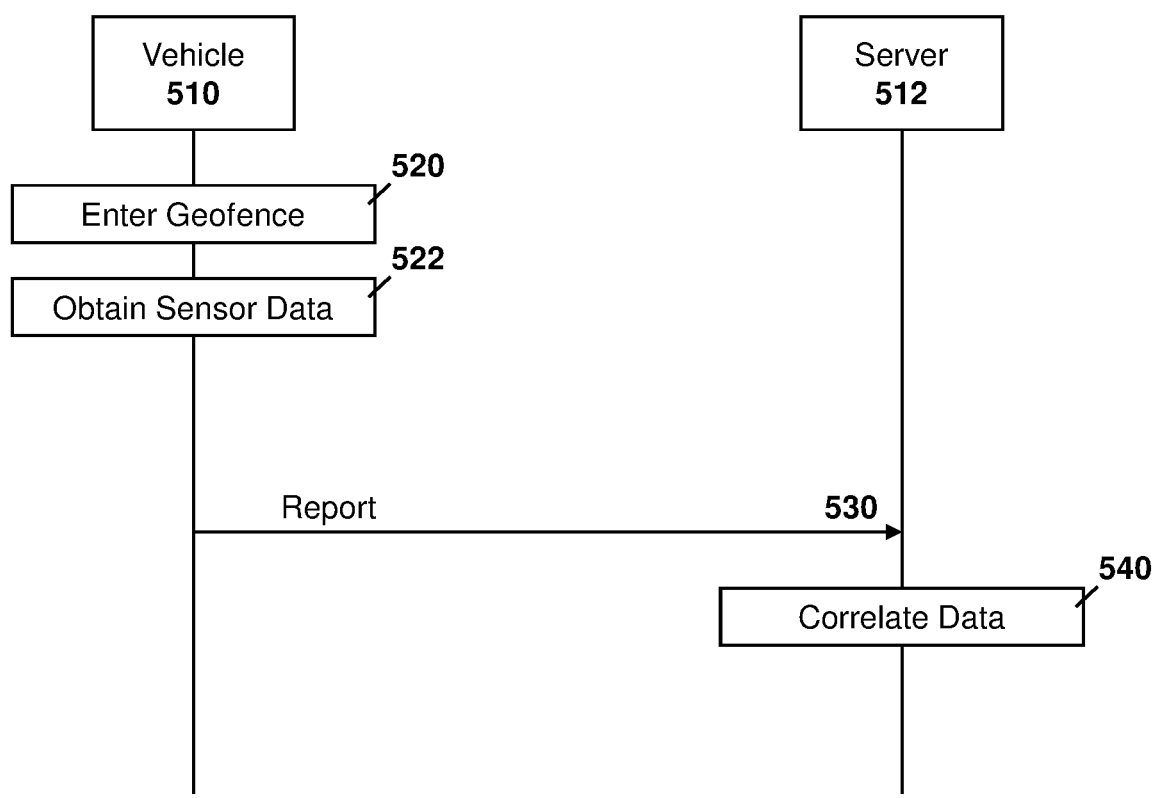
FIG. 5 is a dataflow diagram showing sensor data being provided to a server during a border crossing event.

While the embodiment of FIG. 4 shows the processing and correlation of data occurring at a computing device or sensor apparatus associated with a vehicle, in other cases, raw data may be provided to a server or cloud computing platform to have the processing performed at the server or cloud computing platform. Reference is now made to FIG. 5.

In the embodiment of FIG. 5, a vehicle 510 may be any vehicle that is being tracked for border or checkpoint crossings. A server 512 may be any network based server and includes cloud computing platforms, fleet management servers, amongst others. In some cases, the functionality of server 512 may be distributed between various servers, but server 512 is shown as a single block for simplicity in the embodiment of FIG. 5.

As seen in the embodiment of FIG. 5, a vehicle 510 may enter a border geofence, as shown at block 520.

Once the vehicle enters the border geofence, the process proceeds to block 522 in which sensor data from the sensor apparatus is obtained.

The process then proceeds to block 530 in which a report may be provided to server 512 from vehicle 510. Report 530 may include information such as the time that the vehicle entered the geofence, as well as other sensor data that was obtained at block 522.

The process at server 512 may be to receive report 530 and then correlate the data at block 540. The correlation of the data is similar to that described above for block 422, and server 512 may check for various events such as door opening events, vibration events, accelerometer events, among others. In this way, server 512 can attribute reasons to border crossing delays.

Further, the correlation of data at block 540 may in some cases use external or third party data. For example, the correlation of data at block 540 could use data from a border services agency which is provided, for example, via a public portal or a private portal to a shipping company. In other cases, other data providers such as a weather service may provide the current weather in the location of the border crossing as a factor for the border crossing delay. Other options are possible.

At the server, the data is received and stored. Various operations could then be performed at the server.

Figure 6:
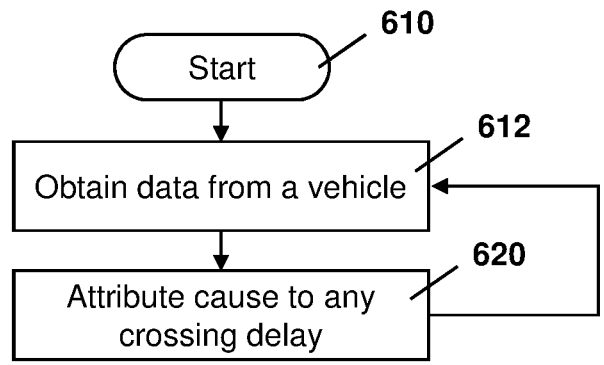
FIG. 6 is a process diagram showing a process at a network element for attributing a cause to a delay at a border crossing.

For example, reference is now made to FIG. 6. In the embodiment of FIG. 6, the server may attribute delays at the border to various causes. In particular, as described above, geofence data along with sensor data is provided and may be correlated together either at the remote computing device or at the server. Using this data, the server may detect reasons for border delays, such as traffic delays, inspections, problems with paperwork, severe weather, among other options. For example, location and accelerometer readings can account for time and traffic. Door open and close sensors can account for inspections. A tie with transactional records may be possible to denote payment for visas. Tie ins with reporting agencies may determine if there are closures due to weather, among other options.

Thus, the process of FIG. 6 starts at block 610 and proceeds to block 612 in which data is obtained from a vehicle. Further, data may be obtained from other sources such as weather reporting services, customs or border agencies, clearance agencies, among others.

The process then proceeds to block 620 in which a cause may be attributed to any crossing delays. The process of block 620 may use the various data from the one or more sources to attribute causes.

Further, in some cases, historical data may be also correlated at block 620. This may indicate busy times or expected way times from a border agent's website or from previous reports from vehicles crossing at this border crossing at similar times of day, for example.

In some cases, if there is no apparent reason for a delay, the reason may be attributed to a driver. For example, the driver may be taking an unscheduled rest stop, among other reasons. Determining reasons for delay can extend to proportioning costs if the fault was within the transport company's control.

From block 620, the process may proceed back to block 612 to obtain more data from vehicles.

In some cases, the server may keep interested parties informed of any delays. For example, if a receiving company needs to have a delivery within a certain time window, a delay may be problematic. In this case, the server may provide notifications to the receiving company. For example, reference is now made to FIG. 7.

Figure 7:
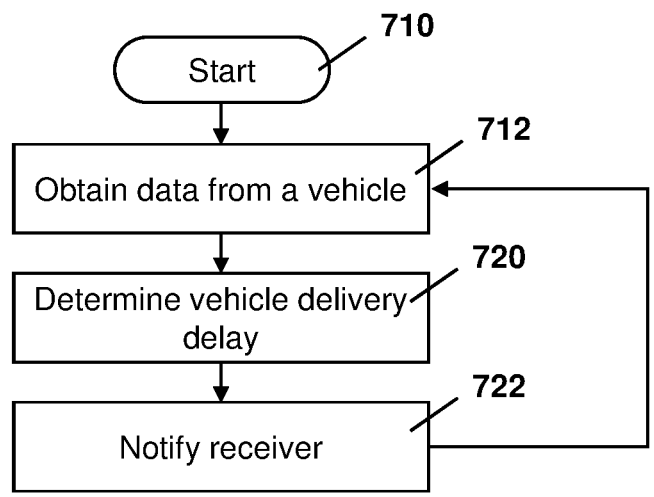
FIG. 7 is a process diagram showing a process at a network element for notifying a receiving company about a delay in a border crossing.

The process of FIG. 7 starts at block 710 and proceeds to block 712 in which data may be obtained from a vehicle.

The process then proceeds to block 720 in which the server may make a determination regarding a delivery delay. For example, if a vehicle is stuck for several hours crossing a border, this may impact the delivery time and the computing device at block 720 may find a new estimated delivery time.

The process then proceeds to block 722 in which the receiving company is notified of the delivery delay, possibly along with a potential new estimated delivery time. In some cases, reasons may also be provided for the delay.

From block 722, the process proceeds back to block 712 in which the server may continue to monitor data from various vehicles.

Figure 8:
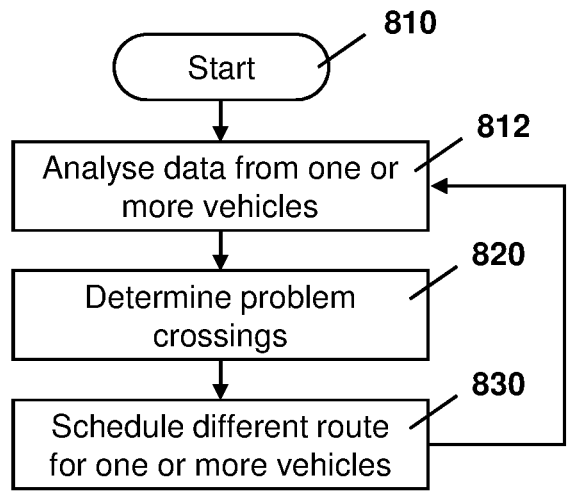
FIG. 8 is a process diagram showing a process at a network element for future route planning based on historic border crossing data.

In still further embodiments, historic data from one or more vehicles may be used to plan future trips. Reference is now made to FIG. 8.

The process of FIG. 8 starts at block 810 and proceeds to block 812 in which historic data from one or more vehicles at the border crossing may be analyzed.

The process then proceeds to block 820 in which problem crossings are identified. The problem crossings may be those crossings that take more time to cross. In some cases, the problem crossings may be identified on a time of day basis. In other cases, the problems crossings may be identified for particular weather conditions or seasonally. Other options for the determination of problem crossings are also possible.

From block 820 the process proceeds to block 830 in which the future scheduling of vehicles may utilize a different route or different crossing. In some cases, the determination at block 820 may be performed on a cost-based analysis. For example, if the cost in terms of time, distance, or money does not exceed the cost for utilizing the problem crossing, then a vehicle may be routed to a different crossing. For example, if a vehicle typically takes two hours to cross a border at a first border point at a particular time of day, and a second border crossing is within 30 minutes and only takes 30 minutes to cross, then the vehicle may be rerouted to the second border crossing. Other options for cost-based analysis are also possible.

Figure 9:
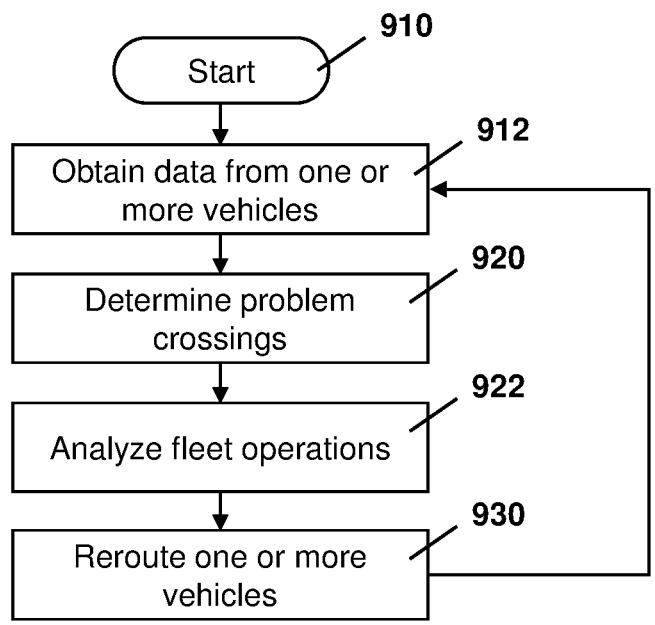
FIG. 9 is a process diagram showing a process at a network element for altering routing of vehicles in a transportation system.

In still a further embodiment, rather than future planning, active control of a fleet may be used to change of the route of vehicles already on-route. Reference is now made to FIG. 9. The process of FIG. 9 starts at block 910 and proceeds to block 912. At block 912, the server obtains data from one or more vehicles.

The process then proceeds to block 920 in which problem border crossings are identified. Problem border crossings may be those with exceptionally long delays, or which may suddenly close, among other options.

The process then proceeds to block 922 in which fleet operations are analyzed. In particular, any vehicle is currently on the road may be reviewed to determine a current position, a planned route, and whether or not the vehicle will cross at the problem crossing. In some cases, a determination may be made at block 922 based on a destination, current position, and other available border crossings, to determine whether a better border crossing exists.

If a better border crossing exists, then the server may, at block 930, communicate with a computing device or driver of the affected vehicle and reroute the vehicle to the better border crossing.

While the embodiments of FIGS. 6 to 9 provide various functionality for a server, other functionally for the server would be apparent to those skilled in the art having regard to the present disclosure.

A server such as servers 240, 242 or 250 may be any network node. For example, one simplified server that may perform the embodiments described above is provided with regards to FIG. 10.

Figure 10:
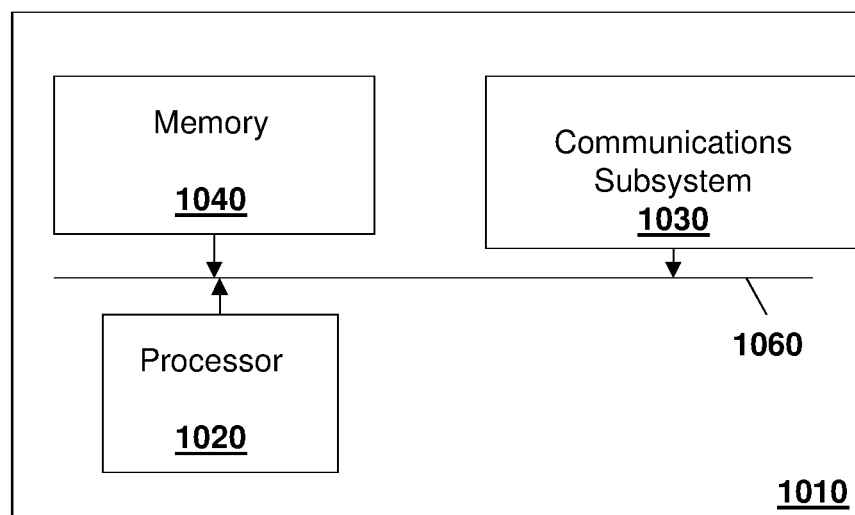
FIG. 10 is a block diagram of an example computing device capable of being used in accordance with the embodiments of the present disclosure.

In FIG. 10, server 1010 includes a processor 1020 and a communications subsystem 1030, where the processor 1020 and communications subsystem 1030 cooperate to perform the methods of the embodiments described herein.

The processor 1020 is configured to execute programmable logic, which may be stored, along with data, on the server 1010, and is shown in the example of FIG. 10 as memory 1040. The memory 1040 can be any tangible, non-transitory computer readable storage medium, such as optical (e.g., CD, DVD, etc.), magnetic (e.g., tape), flash drive, hard drive, or other memory known in the art. In one embodiment, processor 1020 may also be implemented entirely in hardware and not require any stored program to execute logic functions.

Alternatively, or in addition to the memory 1040, the server 1010 may access data or programmable logic from an external storage medium, for example through the communications subsystem 1030.

The communications subsystem 1030 allows the server 1010 to communicate with other devices or network elements.

Communications between the various elements of the server 1010 may be through an internal bus 1060 in one embodiment. However, other forms of communication are possible.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be employed. Moreover, the separation of various system components in the implementation descried above should not be understood as requiring such separation in all implementations, and it should be understood that the described program components and systems can generally be integrated together in a signal software product or packaged into multiple software products. In some cases, functions may be performed entirely in hardware and such a solution may be the functional equivalent of a software solution Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made.

While the above detailed description has shown, described, and pointed out the fundamental novel features of the disclosure as applied to various implementations, it will be understood that various omissions, substitutions, and changes in the form and details of the system illustrated may be made by those skilled in the art. In addition, the order of method steps is not implied by the order they appear in the claims.

When messages are sent to/from an electronic device, such operations may not be immediate or from the server directly. They may be synchronously or asynchronously delivered, from a server or other computing system infrastructure supporting the devices/methods/systems described herein. The foregoing steps may include, in whole or in part, synchronous/asynchronous communications to/from the device/infrastructure. Moreover, communication from the electronic device may be to one or more endpoints on a network. These endpoints may be serviced by a server, a distributed computing system, a stream processor, etc. Content Delivery Networks (CDNs) may also provide may provide communication to an electronic device. For example, rather than a typical server response, the server may also provision or indicate a data for content delivery network (CDN) to await download by the electronic device at a later time, such as a subsequent activity of electronic device. Thus, data may be sent directly from the server, or other infrastructure, such as a distributed infrastructure, or a CDN, as part of or separate from the system.

Typically, storage mediums can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

In particular, the present disclosure may include the embodiments of the following clauses:

AA. A method at a computing device for attributing a cause to a border delay, the method comprising: determining that a vehicle has entered a border geofence; obtaining sensor data from the vehicle; and correlating the sensor data with the determining that the vehicle has entered the geofence to attribute the cause to the border delay.

BB. The method of clause AA, wherein the sensor data includes a door opening event and the cause is an inspection.

CC. The method of clause AA or BB, wherein the sensor data includes accelerometer readings showing repeated starts and stops, indicating a cause of traffic.

DD. The method of any one of clauses AA to CC, further comprising receiving data at the computing device from a third party, and using the data in the correlating.

EE. The method of any one of clauses AA to DD, wherein the computing device is a network server, and wherein the determining and obtaining are based on reports from the vehicle.

FF. The method of clause EE, wherein the network server is further configured to: calculate a shipping delay; and provide a notification to a receiving company or customer of the shipping delay.

GG. The method of clause EE or FF, wherein the network server further stores the reports from the vehicle and compiles historic data for the border crossing.

HH. The method of clause GG, wherein the computing device uses the historic data for future route planning for vehicles.

II. The method of clause GG or HH, wherein the computing device re-routes active vehicles based on the historic data.

JJ. The method of any one of clauses EE to II, wherein the computing device apportions a cost for the border delay based on the cause.

KK. A computing device for attributing a cause to a border delay, the computing device comprising: a processor; and a communications subsystem, wherein the computing device is configured to: determine that a vehicle has entered a border geofence; obtain sensor data from the vehicle; and correlate the sensor data with the determining that the vehicle has entered the geofence to attribute the cause to the border delay.

LL. The computing device of clause KK, wherein the sensor data includes a door opening event and the cause is an inspection.

MM. The computing device of clause KK or LL, wherein the sensor data includes accelerometer readings showing repeated starts and stops, indicating a cause of traffic.

NN. The computing device of any one of clauses KK to MM, wherein the computing device is further configured to receive data at the computing device from a third party, and using the data in the correlating.

OO. The computing device of any one of clauses KK to NN, wherein the computing device is a network server, and wherein the determining and obtaining are based on reports from the vehicle.

PP. The computing device of clause OO, wherein the network server is further configured to: calculate a shipping delay; and provide a notification to a receiving company or customer of the shipping delay.

QQ. The computing device of clause OO or PP, wherein the network server further stores the reports from the vehicle and compiles historic data for the border crossing.

RR. The computing device of clause QQ, wherein the computing device uses the historic data for future route planning for vehicles.

SS. The computing device of clause QQ or RR, wherein the computing device re-routes active vehicles based on the historic data.

TT. The computing device of any one of clauses OO to SS, wherein the computing device apportions a cost for the border delay based on the cause.

UU. A computer readable medium for storing instruction code, which, when executed by a processor of a computing device configured for attributing a cause to a border delay cause the computing device to: determine that a vehicle has entered a border geofence; obtain sensor data from the vehicle; and correlate the sensor data with the determining that the vehicle has entered the geofence to attribute the cause to the border delay.

VV. The computer readable medium of clause UU, wherein the sensor data includes a door opening event and the cause is an inspection.

WW. The computer readable medium of clause UU or VV, wherein the sensor data includes accelerometer readings showing repeated starts and stops, indicating a cause of traffic.

XX. The computer readable medium of any one of clauses UU to WW, wherein the computing device is further configured to receive data at the computing device from a third party, and using the data in the correlating.

YY. The computer readable medium of any one of clauses UU to XX, wherein the computing device is a network server, and wherein the determining and obtaining are based on reports from the vehicle.

ZZ. The computer readable medium of clause YY, wherein the network server is further configured to: calculate a shipping delay; and provide a notification to a receiving company or customer of the shipping delay.

AAA. The computer readable medium of clause YY or ZZ, wherein the network server further stores the reports from the vehicle and compiles historic data for the border crossing.

BBB. The computer readable medium of clause AAA, wherein the computing device uses the historic data for future route planning for vehicles.

CCC. The computer readable medium of clause AAA or BBB, wherein the computing device re-routes active vehicles based on the historic data.

DDD. The computer readable medium of any one of clauses YY to CCC, wherein the computing device apportions a cost for the border delay based on the cause.

The invention claimed is:

1. A method at a computing device for attributing a cause to a border delay, the method comprising:
receiving third-party data, the third-party data comprising data from a border agency associated to a border crossing indicating a wait time at the border crossing;
determining a size of a border geofence around the border crossing based on the wait time, wherein the size of the border geofence is selected to include a traffic queue waiting to reach the border crossing;
receiving, from a vehicle, a report over an electronic communication network;
determining, from the report, that the vehicle has entered the border geofence;
obtaining sensor data of the vehicle from the report;
correlating the sensor data with the determining that the vehicle has entered the geofence to attribute the cause to the border delay;
assigning a cost for the border delay based on the cause; and
based on historic data and the cost for the border delay, sending instructions over the electronic communication network to active vehicles to change routes.

2. The method of claim 1, wherein the sensor data includes a door opening event and the cause is an inspection.

3. The method of claim 1, wherein the sensor data includes accelerometer readings showing repeated starts and stops, indicating a cause of traffic.

4. The method of claim 1, further comprising:
calculating a shipping delay; and
providing a notification to a receiving company or customer of the shipping delay.

5. The method of claim 1, further comprising storing the report from the vehicle and compiling historic data for the border crossing.

6. The method of claim 5, wherein the computing device uses the historic data for future route planning for vehicles.

7. A computing device for attributing a cause to a border delay, the computing device comprising:
a processor; and
a communications subsystem,
wherein the computing device is configured to:
receive third-party data, the third-party data comprising data from a border agency associated to a border crossing indicating a wait time at the border crossing;
determine a size of a border geofence around the border crossing based on the wait time, wherein the size of the border geofence is selected to include a traffic queue waiting to reach the border crossing;
receive, from a vehicle, a report over an electronic communication network;
determine, from the report, that the vehicle has entered the border geofence;
obtain sensor data of the vehicle from the report;
correlate the sensor data with the determining that the vehicle has entered the geofence to attribute the cause to the border delay;
assign a cost for the border delay based on the cause; and
based on historic data and the cost for the border delay, sending instructions over the electronic communication network to active vehicles to change routes.

8. The computing device of claim 7, wherein the sensor data includes a door opening event and the cause is an inspection.

9. The computing device of claim 7, wherein the sensor data includes accelerometer readings showing repeated starts and stops, indicating a cause of traffic.

10. The computing device of claim 7, wherein the computing device is further configured to:
calculate a shipping delay; and
provide a notification to a receiving company or customer of the shipping delay.

11. The computing device of claim 7, wherein the computing device further stores the report from the vehicle and compiles historic data for the border crossing.

12. The computing device of claim 11, wherein the computing device uses the historic data for future route planning for vehicles.

13. A non-transitory computer readable medium for storing instruction code, which, when executed by a processor of a computing device configured for attributing a cause to a border delay cause the computing device to:
receive third-party data, the third-party data comprising data from a border agency associated to a border crossing indicating a wait time at the border crossing;
determine a size of a border geofence around the border crossing based on the wait time, wherein the size of the border geofence is selected to include a traffic queue waiting to reach the border crossing;
receive, from a vehicle, a report over an electronic communication network;

determine, from the report, that the vehicle has entered the border geofence;
obtain sensor data of the vehicle from the report;
correlate the sensor data with the determining that the vehicle has entered the geofence to attribute the cause to the border delay;
assign a cost for the border delay based on the cause; and
based on historic data and the cost for the border delay, sending instructions over the electronic communication network to active vehicles to change routes.

14. The non-transitory computer readable medium of claim 13, wherein the sensor data includes a door opening event and the cause is an inspection.

15. The non-transitory computer readable medium of claim 13, wherein the sensor data includes accelerometer readings showing repeated starts and stops, indicating a cause of traffic.

16. The non-transitory computer readable medium of claim 13, wherein the instruction code further causes the computing device to:
   calculate a shipping delay; and
   provide a notification to a receiving company or customer of the shipping delay.

17. The non-transitory computer readable medium of claim 13, wherein the instruction code further causes the computing device to store the report from the vehicle and compiling historic data for the border crossing.

18. The non-transitory computer readable medium of claim 17, wherein the instruction code further causes the computing device to use the historic data for future route planning for vehicles.

* * * * *